Feb. 13, 1945.  R. WATTS  2,369,328
BRAKE ROTOR
Filed July 22, 1943   2 Sheets-Sheet 1
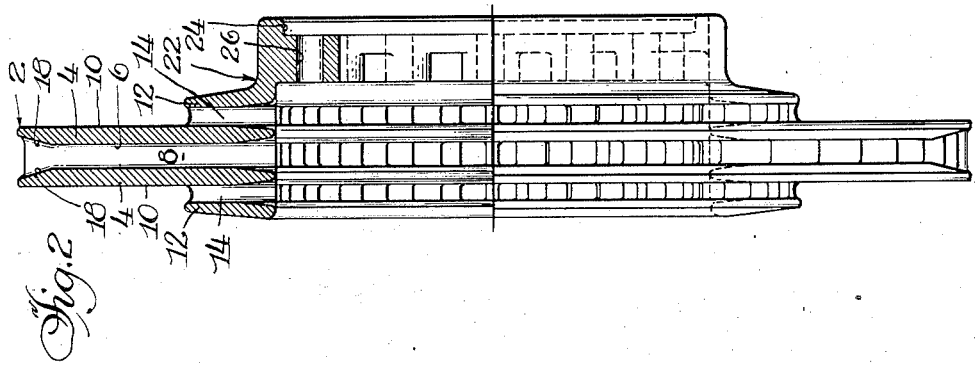
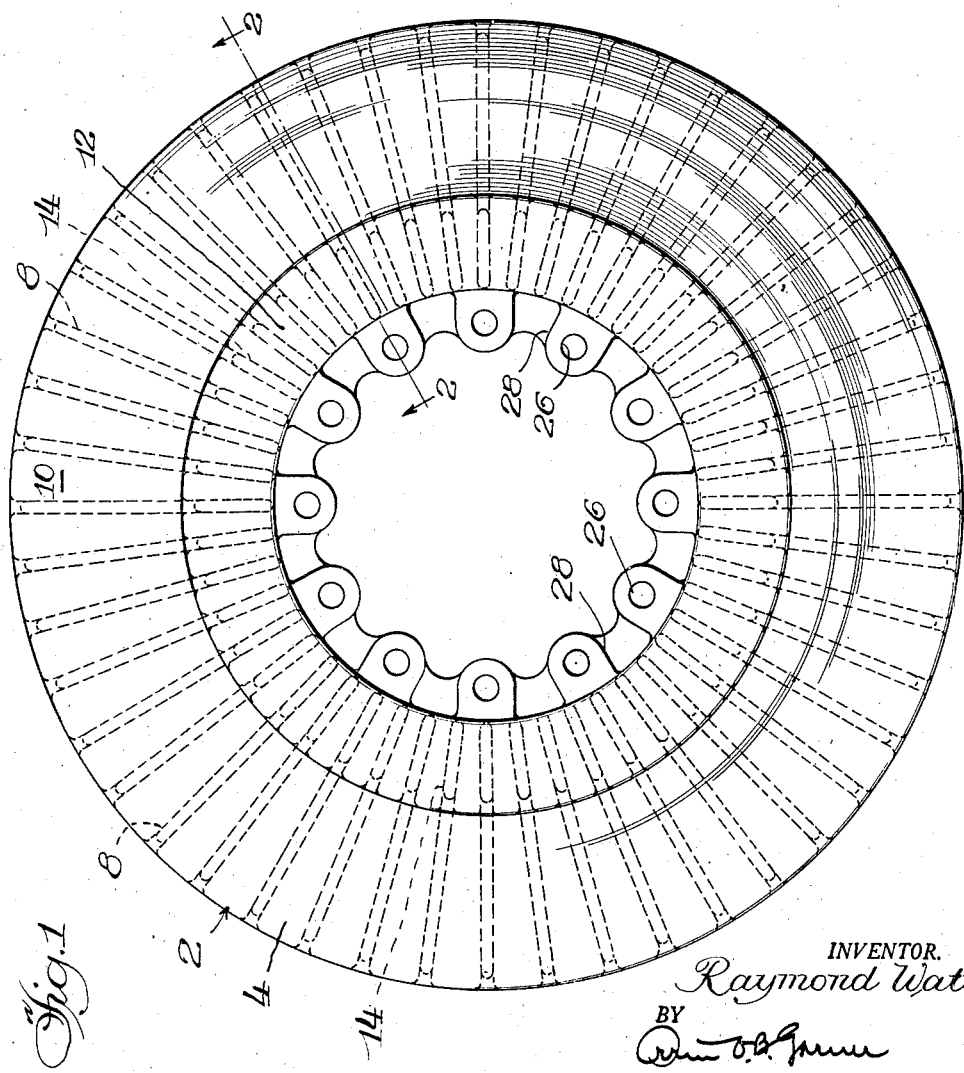
INVENTOR.
Raymond Watts
BY
Atty Feb. 13, 1945.  R. WATTS  2,369,328
BRAKE ROTOR
Filed July 22, 1943   2 Sheets-Sheet 2

INVENTOR.
Raymond Watts,
BY
Atty.

Patented Feb. 13, 1945

2,369,328

UNITED STATES PATENT OFFICE 2,369,328

BRAKE ROTOR

Raymond Watts, Chicago, Ill., assignor to American Steel Foundries, Chicago, Ill., a corporation of New Jersey Application July 22, 1943, Serial No. 495,688

20 Claims. (Cl. 188—264)

My invention relates to rotors and more particularly to a brake disc or rotor adapted to be attached to an associated rotating element such as the wheel of a railway car truck for braking the same.

My novel rotor is especially adapted for utilization in a brake disc arrangement for a railway car truck; however, it will be understood that the rotor may be used for any purpose to which it may be adapted.

The general object of my invention is to provide a rotor comprising means for directing a cooling flow of air or other fluid in which the rotor may operate over the friction faces thereof in the manner generally illustrated and described in Eksergian Patent No. 2,208,525.

Experience with this type of rotor, however, has indicated that turbulence or burbles is created at the radially outer extremity of the brake ring and gradually extends radially inwardly to disturb the air flow directed against the friction faces of the brake ring; and it is therefore a specific object of my invention to obtain continuity of said air flow unbroken by turbulence or burbles, thereby obtaining a smooth continuous high velocity flow stream held as closely as possible against the friction faces of the rotor.

My novel rotor comprehends spaced friction plates defining an air chamber therebetween, and said chamber is divided into a plurality of air flow passages by blower blades extending between the plates, said chamber being flared or streamlined at its radially outer extremity to avoid the formation of burbles, thereby holding closely to the friction faces on the plates the flow of air directed upon said faces from blower means located radially inwardly thereof.

Another object of my invention is to provide a rotor of the above described type in which the support hub is joined to one of the annular plates disposed at opposite sides of the friction rings to define therewith blower means inwardly of the friction faces.

A different object of my invention is to design the various air flow passages formed in my novel rotor in such manner that they taper in cross-sectional area toward the radially outer ends thereof, thus affording a Venturi action increasing the velocity of the air flow and thereby increasing the cooling effect thereof.

In the drawings, Figure 1 is a side elevation of one embodiment of my novel rotor, and Figure 2 is an edge view taken from the right as seen in Figure 1 and partially in section, as indicated by the line 2—2 of Figure 1.

Figure 3:
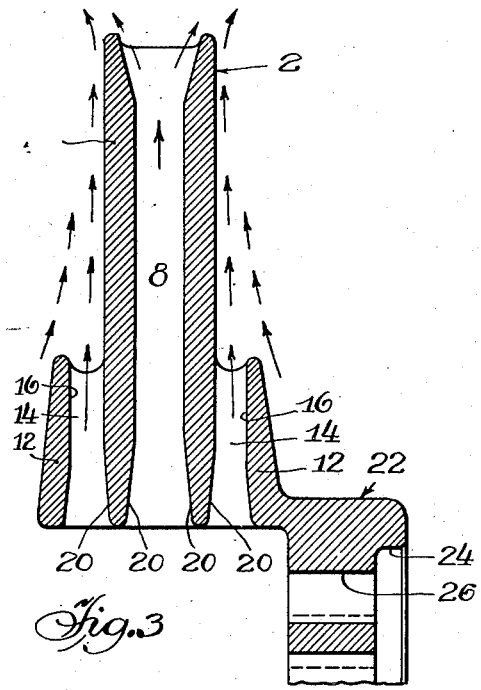
Figure 3 is a fragmentary and somewhat enlarged view of the portion of the rotor shown in section in Figure 2.

Describing my novel rotor in detail and referring first to the embodiment thereof as illustrated in Figures 1 to 3 inclusive, the rotor comprises a brake ring generally designated 2 and formed by the spaced friction rings 4, 4 defining therebetween the annular air chamber 6 divided into a plurality of air flow passages by the spaced radial blower blades 8, 8. The friction rings 4, 4 present on the remote surfaces thereof the friction faces 10, 10 for engagement with associated brake shoes or other nonrotatable brake means for braking the rotatable element to which the rotor is attached, as hereinafter described.

Located radially inwardly of these friction faces 10, 10 are means for producing an air flow which has a radially outward direction, said flow impinging directly upon both of said friction faces 10, 10. The means for producing this air flow comprises spaced annular plates 12, 12 at opposite sides of the brake ring 2 and connected to the adjacent friction rings 4, 4 by means of blower blades 14, 14. The blades 14, 14, the plates 12, 12, and the friction rings 4, 4 define a plurality of air flow passages 16, 16 (Figure 3) from which air is impelled during rotation of the rotor in such manner as to impinge directly upon the friction faces 10, 10; and it will be clearly seen from the sectional views of Figures 2 and 3 that the plates 12, 12 are tapered or streamlined toward the radially outer extremities thereof to prevent the formation of burbles or turbulence adjacent said extremities, and likewise the chamber between the rings 4, 4, through which additional cooling air is impelled during rotation of the rotor is flared or streamlined at 18, 18 (Figure 2) at its radially outer extremity in order to avoid turbulence or burbles at the outer edge of the brake ring 2. Also the friction rings 4, 4 are tapered or streamlined at their radially inner extremities as at 20, 20 (Figure 3) to afford a smooth flow of air through the chamber 8 and through the passages 16, 16.

It will be understood that by means of the streamlining features above described, the air flow across the friction faces 10, 10 of the brake ring 2 is a smooth continuous high velocity flow stream and is held as closely as possible against said faces 10, 10, as indicated by the arrows in Figure 3. It has been found that this arrangement is an extremely practical one for utilizing the air flow from the passages 16, 16 to cool the friction faces of the brake ring.

Attached to one of the annular plates 12, 12 is the hub portion 22 of the rotor, said portion being formed with a bore 24 for the reception of a hub on an associated wheel, and the portion 22 also being provided with a plurality of openings 26, 26 therethrough for the reception of securing means for attaching the rotor to said wheel, the openings 26, 26 being reinforced by bosses 28, 28.

Figure 4:
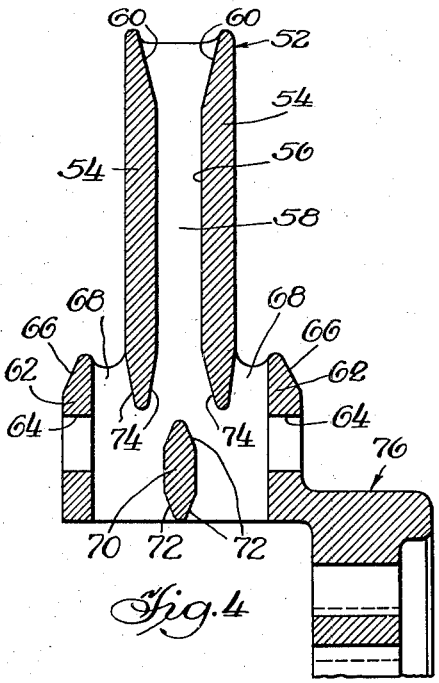
Figures 4 and 5 are fragmentary sectional views comparable to Figure 3 and showing respectively modifications of my invention.

In the modification of my device illustrated in Figure 4, the brake ring generally designated 52 is substantially identical with that illustrated in Figure 1 and comprises the friction rings 54, 54 defining the annular air chamber 56 therebetween, said chamber being divided into a plurality of air flow passages by the radial blower blades 58, 58, the chamber 56 being flared as at 60 at its radially outer extremity for a similar purpose to that described for the previous embodiment of my invention. At opposite sides of the friction rings 54, 54 are the annular plates 62, 62 each being formed with a plurality of air inlet openings 64, 64 therethrough and each being tapered at its radially outer extremity as at 66 to avoid turbulence or burbles at said extremity. The plates 62, 62 are connected to the brake ring 52 by means of radial blades 68, 68 as in the previous embodiment, and intermediate said plates 62, 62 is formed a reinforcing ring 70 streamlined or tapered as at 72, 72 to afford a smooth flow of air therearound, and likewise the radially inner extremities of the friction rings 54, 54 are tapered or streamlined as at 74, 74. Integrally formed with one of the annular plates 62 is a hub member 76 generally similar to that described for the previous embodiment.

Figure 5:
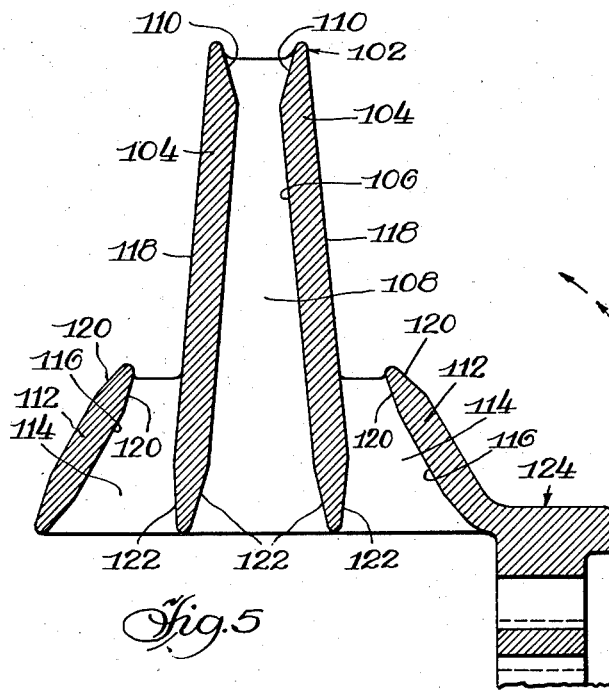

Another modification of my invention is illustrated in Figure 5, wherein the brake ring generally designated 102 is formed by the spaced friction rings 104, 104 defining therebetween the air chamber 106 divided into a plurality of air flow passages by means of the radial blower blades 108, 108, said chamber being flared at its radially outer extremity as at 110 for a purpose generally similar to that described for the previous embodiments of my invention.

It will be understood that in the modification shown in Figure 5, the friction rings 104, 104 are inclined toward each other so that the chamber 108 tapers toward the flared portion 110 thereof to afford a Venturi action resulting in a substantial increase in the velocity of the air flow through the chamber 106 as the rotor is rotated. At opposite sides of the friction rings 104, 104 are the spaced annular plates 112, 112, said plates being connected to the adjacent friction rings 104, 104 by means of the radial blower blades 114, 114 defining therewith a plurality of air flow passages 116, 116 through which air is impelled against the friction faces 118, 118 of the rings 104, 104. It will be noted that the annular plates 112, 112 are inclined toward each other so that the air flow passages 116, 116 taper in cross-sectional area toward their radially outer extremities to afford a Venturi action increasing the velocity of the air flow therethrough. The plates 112, 112 are tapered at their radially outer extremities as at 120, 120 to avoid the formation of burbles adjacent said extremities, as described for the previous embodiments of my invention, and likewise the radially inner extremity of the friction rings 104, 104 are tapered or streamlined at 122, 122 to afford a smooth flow of air therealong. Integrally formed with one of the plates 112 is a hub portion 124 generally similar to those shown in Figures 2 to 4 inclusive.

Figure 6:
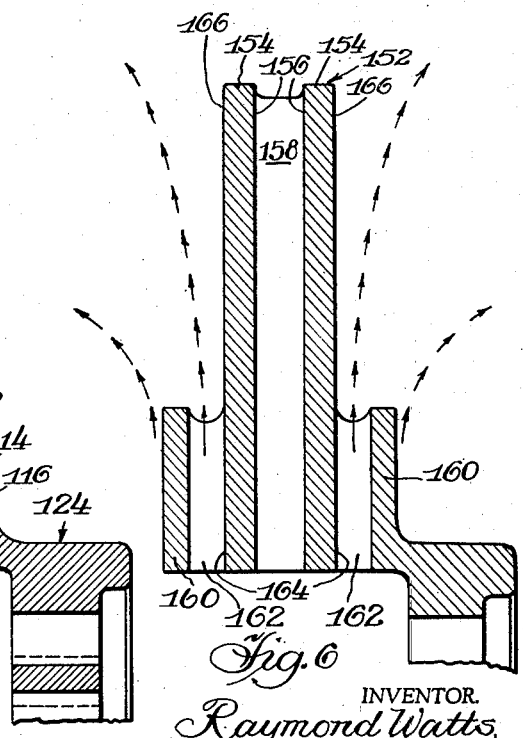
Figure 6 is a fragmentary sectional view comparable to those of Figures 3 to 5 inclusive, but showing the conditions prevailing in an unstreamlined rotor of this general type.

Figure 6 illustrates an unstreamlined rotor of the general type illustrated herein, wherein the brake ring generally designated 152 is somewhat similar to those illustrated in the preceding figures and comprises the spaced friction rings 154, 154 defining therebetween the annular air chamber 156 which is subdivided into a plurality of air flow passages by means of the radial blower blades 158, 158. At opposite sides of the friction rings 154, 154 are the annular plates 160, 160 connected to the adjacent friction rings by means of the radial blower blades 162, 162 defining with said plates and said rings a plurality of air flow passages 164, 164 through which passages air is impelled during rotation of the rotor against the friction faces 166, 166 of the friction rings 154, 154.

I have found that in a rotor such as that illustrated in Figure 6, the air flow through the passages 164, 164 is that indicated by the arrows in this figure, from which it will be apparent that turbulence or burbles formed at the radial outer extremity of the brake ring 152 causes the air flow through the passages 164, 164 to be diverted from the friction faces 166, 166 in such manner as to greatly impair the cooling effects of this air flow. Likewise, turbulence at the radially outer extremities of the plates 160, 160 diverts the air drawn from opposite sides of the rotor, as indicated by the arrows in this figure.

It is to be understood that I do not wish to be limited by the exact embodiments of the device shown which are merely by way of illustration and not limitation, as various and other forms of the device will, of course, be apparent to those skilled in the art without departing from the spirit of the invention or the scope of the claims.

I claim:

1. In a rotor, a brake ring, means for attaching said ring to a rotatable element to be braked thereby, said ring comprising two spaced friction rings defining an annular air chamber therebetween, and each of said friction rings having an annular radial friction surface at its outer end, means for producing air currents, said last-mentioned means being located radially inwardly of said friction surfaces for producing an air flow which has a radially outward direction, said flow impinging directly upon both of said friction surfaces, and spaced blower blades extending between said friction rings for producing another air flow in a radially outward direction, said chamber being flared at its outer extremity to prevent the formation of air burbles, said last-mentioned means including a plurality of air flow passages tapering in cross-sectional area toward the radially outward extremities thereof, said passages being flared at their outer ends to prevent the formation of air burbles.

2. In a rotor, a brake ring, means for attaching said ring to a rotatable element to be braked thereby, said ring comprising two spaced friction rings defining an annular air chamber therebetween, and each of said friction rings having an annular radial friction surface at its outer end, means for producing air currents, said last-mentioned means being located radially inwardly of said friction surfaces for producing an air flow which has a radially outward direction, said flow impinging directly upon both of said friction surfaces, and spaced blower blades extending between said friction rings for producing another air flow in a radially outward direction, said chamber being flared at its outer extremity to prevent the formation of air burbles, said last-mentioned means including a plurality of air flow passages tapering in cross-sectional area toward the radially outward extremities thereof.

3. In a rotor, a brake ring, means for attaching said ring to a rotatable element to be braked thereby, said ring comprising two spaced friction rings defining an annular air chamber therebetween, and each of said friction rings having an annular radial friction surface at its outer end, means for producing air currents, said last-mentioned means being located radially inwardly of said friction surfaces for producing an air flow which has a radially outward direction, said flow impinging directly upon both of said friction surfaces, and spaced blower blades extending between said friction rings for producing another air flow in a radially outward direction, said chamber being flared at its radially outer extremity to prevent the formation of air burbles, and said chamber tapering in cross-sectional area toward the flared portion thereof.

4. In a rotor, a brake ring, means for attaching said ring to a rotatable element to be braked thereby, said ring comprising two spaced friction rings defining an annular air chamber therebetween, and each of said friction rings having an annular radial friction surface at its outer end, means for producing air currents, said last-mentioned means being located radially inwardly of said friction surfaces for producing an air flow which has a radially outward direction, said flow impinging directly upon both of said friction surfaces, and spaced blower blades extending between said friction rings for producing another air flow in a radially outward direction, said last-mentioned means including a plurality of air flow passages tapering in cross-sectional area toward the radially outward ends thereof, said passages being flared at their outer ends to prevent the formation of air burbles.

5. In a rotor, a brake ring, means for attaching said ring to a rotatable element to be braked thereby, said ring comprising two spaced friction rings defining an annular air chamber therebetween, and each of said friction rings having an annular radial friction surface at its outer end, means for producing air currents, said last-mentioned means being located radially inwardly of said friction surfaces for producing an air flow which has a radially outward direction, said flow impinging directly upon both of said friction surfaces, and spaced blower blades extending between said friction rings for producing another air flow in a radially outward direction, said last-mentioned means including a plurality of air flow passages tapering in cross-sectional area toward the radially outward ends thereof.

6. In a brake rotor, a brake ring, spaced annular plates at opposite sides of said ring, spaced blades extending between said ring and each plate and defining fluid flow passages therewith, said passages tapering in cross-sectional area toward their radially outer extremities, and said passages being flared at said outer extremities thereof.

7. In a brake rotor, a brake ring comprising friction surfaces on opposite sides thereof, spaced annular plates at opposite sides of said brake ring and disposed radially inwardly of said surfaces, spaced blades extending between each plate and said ring, and means on one of said plates for attaching said rotor to an associated rotating element.

8. In a rotor, a brake ring comprising spaced friction rings defining an annular air chamber therebetween, said chamber being flared at its outer extremity, spaced blower blades extending between said spaced rings, spaced annular plates at opposite sides of said brake ring, spaced blower blades extending between each plate and the adjacent friction ring and defining air flow passages therewith, said passages tapering in cross-sectional area toward their radially outer ends, and means on one of said plates for attaching said rotor to an associated rotating element, said passages being flared at said outer ends thereof to prevent formation of air burbles.

9. In a brake rotor, a brake ring comprising friction surfaces on opposite sides thereof, spaced annular plates at opposite sides of said brake ring and disposed radially inwardly of said surfaces, spaced blades extending between each plate and said ring, and a hub integrally formed on the inner perimeter of one of said plates, said hub projecting axially of said ring toward one side thereof and comprising a bore for the reception of a complementary portion of an associated rotating member, and openings through said hub for the reception of means securing said rotating member thereto.

10. In a brake rotor, a brake ring, means for attaching said ring to a rotatable element to be braked thereby, said ring having annular radial friction surfaces at opposite sides thereof and disposed at its outer end, means for producing air currents, said last-mentioned means being located radially inwardly of said friction surfaces for producing air flow which has a radially outward direction, said flow impinging directly upon said friction surfaces, said last-mentioned means including a plurality of air flow passages tapering in cross-sectional area toward the radially outward ends thereof, said passages being flared at their outer ends to prevent formation of air burbles.

11. In a rotor, a brake ring comprising spaced friction rings defining an annular air chamber therebetween, said chamber being flared at its radially outer extremity, spaced blower blades extending between said spaced rings, spaced annular plates at opposite sides of said brake ring and disposed radially inwardly of friction surfaces formed on said friction rings, spaced blower blades extending between each plate and the adjacent friction ring, said plates being tapered toward the radially outer extremities thereof to prevent the formation of air burbles at said extremities, and means on one of said plates for attaching said rotor to an associated rotating element.

12. In a rotor, a brake ring comprising spaced friction rings defining an annular air chamber therebetween, said chamber being flared at its outer extremity, spaced blower blades extending between said spaced rings, spaced annular plates at opposite sides of said brake ring, spaced blower blades extending between each plate and the adjacent friction ring and defining air flow passages therewith, said passages tapering in cross-sectional area toward their radially outer ends, and means on one of said plates for attaching said rotor to an associated rotating element.

13. In a brake rotor, a brake ring, means for attaching said ring to a rotatable element to be braked thereby, said ring having annular radial friction surfaces at opposite sides thereof and disposed at its outer end, means for producing air currents, said last-mentioned means being located radially inwardly of said friction surfaces for producing air flow which has a radially outward direction, said flow impinging directly upon said friction surfaces, said last-mentioned means including a plurality of air flow passages tapering in cross-sectional area toward the radially outward ends thereof.

14. In a rotor, a brake ring, spaced annular plates at opposite sides of said brake ring, spaced blower blades extending between said ring and each plate and defining air flow passages therewith, said passages tapering in cross-sectional area toward their radially outer ends, and means on one of said plates for attaching said rotor to an associated rotating element, said passages being flared at said outer ends thereof to prevent formation of air burbles.

15. In a rotor, a brake ring comprising spaced friction rings defining an annular air chamber therebetween, spaced blower blades extending between said spaced rings, spaced annular plates adjacent the radially inner extremities of said friction rings, spaced blower blades extending between each plate and the adjacent friction ring, an annular reinforcing ring disposed intermediate said plates and integrally formed with the last-mentioned blades, and air inlets through said plates.

16. In a rotor, a brake ring comprising spaced friction rings defining an annular air chamber therebetween, said chamber being flared at its outer extremity, spaced blower blades extending between said spaced rings, spaced annular plates at opposite sides of said brake ring, spaced blower blades extending between each plate and the adjacent friction ring, and a hub member integrally formed on one of said plates at the inner perimeter thereof for attaching said rotor to an associated rotating element.

17. In a rotor, a brake ring, means for attaching said ring to a rotatable element to be braked thereby, said ring comprising spaced friction rings defining an annular air chamber therebetween, and each of said rings having an annular friction surface, said chamber being flared at its outer extremity to prevent the formation of air burbles, said chamber tapering in cross-sectional area toward the flared portion thereof.

18. In a rotor, a brake ring, spaced annular plates at opposite sides of said brake ring, spaced blower blades extending between said ring and each plate and defining air flow passages therewith, said passages tapering in cross-sectional area toward their radially outer ends, and means projecting from one of said plates at one side of said ring for attaching said rotor to an associated rotating element.

19. In a brake rotor, spaced friction plates defining a fluid chamber therebetween, said plates presenting friction faces on their remote sides, blade means carried by said plates within said chamber, and fluid inlet means communicating with said chamber, said chamber being flared at its radially outer extremity and tapering in cross-sectional area toward said flared portion.

20. In a brake rotor, a brake ring comprising spaced friction rings defining an annular air chamber therebetween, spaced blower blades extending between said spaced rings, spaced annular plates at opposite sides of said brake ring, spaced blower blades extending between each plate and the adjacent friction ring, and means on one of said plates for attaching said rotor to an associated rotating element.

RAYMOND WATTS.